US006975604B1

United States Patent
Ishida et al.

(10) Patent No.: US 6,975,604 B1
(45) Date of Patent: Dec. 13, 2005

(54) BASE STATION CONTROLLER AND MOBILE STATION

(75) Inventors: Kazuhito Ishida, Yokohama (JP); Shiro Mazawa, Yokohama (JP); Seiko Shimogawa, Yokohama (JP); Toshiaki Kurokawa, Yokohama (JP); Tsutomu Yamaguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1018 days.

(21) Appl. No.: 09/620,348

(22) Filed: Jul. 20, 2000

(30) Foreign Application Priority Data

Jul. 21, 1999 (JP) .......................... P11-205772

(51) Int. Cl.[7] ............................. H04Q 7/00
(52) U.S. Cl. ................. 370/331; 370/332; 370/333; 370/334
(58) Field of Search ................. 370/312, 323, 370/328, 329, 333, 334, 336, 337, 341, 345, 331, 332, 432, 433

(56) References Cited

U.S. PATENT DOCUMENTS

| 5,088,108 | A | 2/1992 | Uddenfeldt et al. .......... 375/12 |
| 5,101,501 | A | 3/1992 | Gilhousen et al. ............ 455/33 |
| 5,109,528 | A | 4/1992 | Uddenfeldt ................ 455/33.2 |
| 5,267,261 | A | 11/1993 | Blakeney, II et al. ........... 375/1 |
| 5,327,577 | A | 7/1994 | Uddenfeldt ................ 455/33.2 |
| 6,141,353 | A | * 10/2000 | Li .............................. 370/465 |
| 6,445,917 | B1 | * 9/2002 | Bark et al. .................. 455/423 |
| 6,539,205 | B1 | * 3/2003 | Wan et al. .................. 370/465 |
| 6,590,879 | B1 | * 7/2003 | Huang et al. ............... 370/331 |

FOREIGN PATENT DOCUMENTS

WO    WO 97/21294    6/1997

OTHER PUBLICATIONS

U.S. Appl. No. 09/261,180, filed Mar. 3, 1999.

* cited by examiner

*Primary Examiner*—Phirin Sam
(74) *Attorney, Agent, or Firm*—Knoble Yoshida & Dunleavy, LLC

(57) ABSTRACT

A base station controller and a mobile station to achieve high speed transmission and effective use of radio resources in a radio communications system. A communication system includes a plurality of base stations in order to provide communication among a mobile station, another mobile station and a communication link. The communication links for use in the communication are selected base on the channel quality of the communications links. The communication information is then demultiplexed for each selected link, and the data is sent parallel by way of the demultiplexed communication information along the selected communication links to allow high speed transmission.

24 Claims, 13 Drawing Sheets

NOTE:
- QI = QUALITY INFORMATION
- FEC = FORWARD ERROR CORRECTION
- TAIL = APPENDED BIT FOR FEC
- ID = IDENTIFIER

FIG. 8

(A) DATA RATE PARAMETERS PER LINE

| LOWEST Ec/Io | s | i | .... | v | w |
|---|---|---|---|---|---|
| LOWEST Eb/No | k | l | .... | m | n |
| MAXIMUM ALLOWABLE DATA RATE PER CH | K | L | .... | M | N |
| FER PER LINE | USE FOR RATING THE QUALITY OF EACH LINE FOR INSTANCE, LOWER THE DATA RATE IF THE FER DROPS BELOW THE STANDARD VALUE. | | | | |

(B) TOTAL DATA RATE PARAMETERS AFTER MULTIPLEXING

| ESTIMATED DATA RATE TOTAL SUM PER LINE | a | b | | c | d |
|---|---|---|---|---|---|
| INTERFERENCE MARGIN COEFFICIENT | A SPECIFIED LINE SHALL BE USED, WHEN THE USE OF THE SAME FREQUENCY OR TIME SLOT IS ALLOWED BETWEEN CIRCUITS, THIS DEPENDS ON THE LINE RESERVE METHOD AND THE EXTENT OF THE INTERFERENCE MARGIN OF THE SYSTEM. | | | | |
| MAXIMUM ALLOWABLE DATA RATE (AFTER MULTIPLEXING) | W | X | .... | Y | Z |
| FER AFTER MULTIPLEXING | USE FOR RATING THE QUALITY OF EACH LINE AFTER MULTIPLEXING. FOR INSTANCE, LOWER THE DATA RATE IF THE FER DROPS BELOW THE STANDARD VALUE. | | | | |

(C) INTERLEAVE SIZE PARAMETERS OF MULTIPLEXED SIGNAL

| NUMBER OF CONNECTED LINES | a | b | | c | d |
|---|---|---|---|---|---|
| DATA RATE RATIO BETWEEN CIRCUITS | p | q | | r | s |
| INTERLEAVE SIZE (NUMBER OF FRAMES FOR INTERLEAVE) | s | t | .... | v | w |

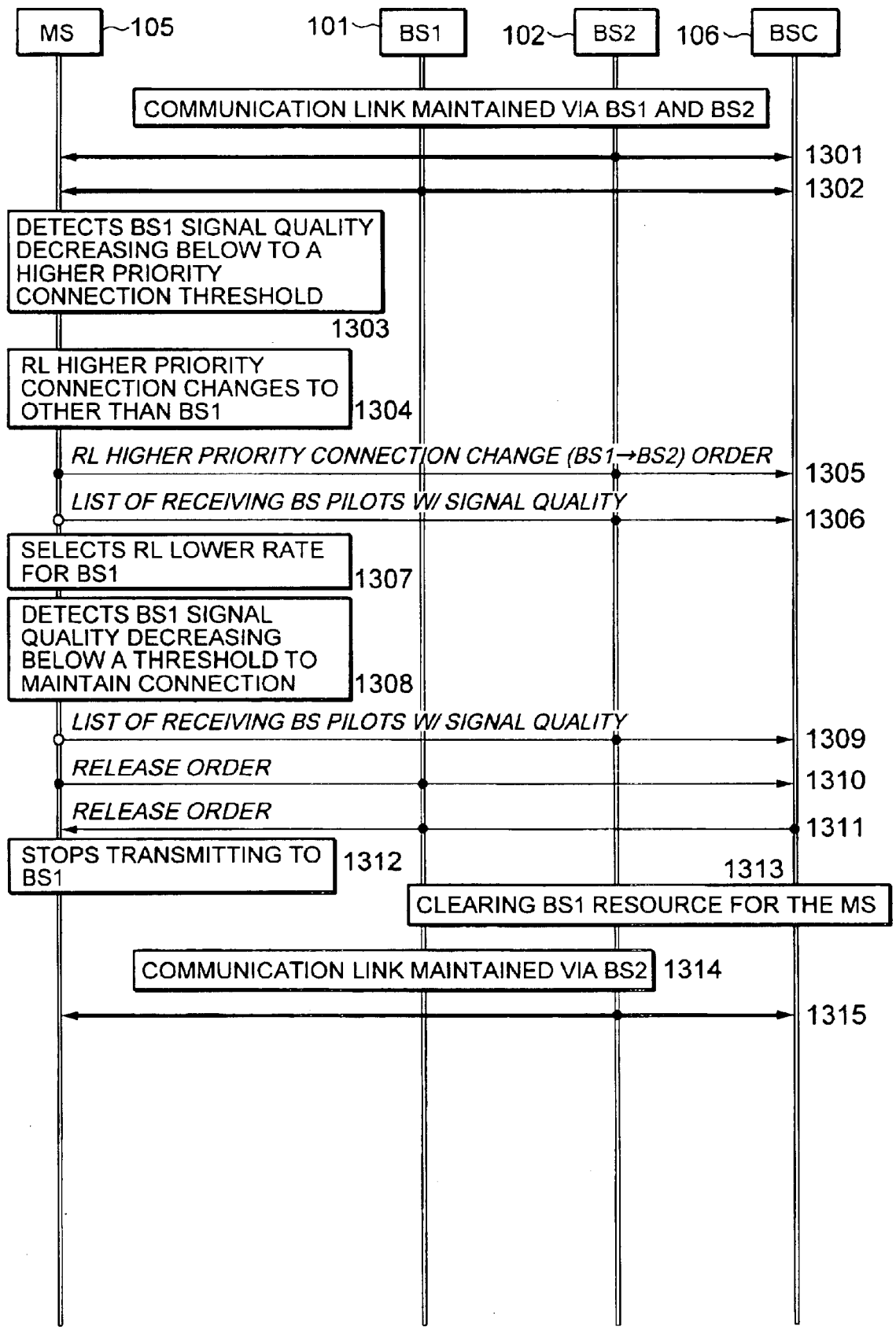

BASE STATION CONTROLLER AND MOBILE STATION

BACKGROUND OF THE INVENTION

This invention relates to communications controller for a radio communications system. In most cases of the related art, a mobile station communicates with one base station during normal calls. However, during a handover, a mobile station is connected to a plurality of base stations. The background includes U.S. Pat. No. 5,101,501, U.S. Pat. No. 5,267,261, U.S. Pat. No. 5,088,108, U.S. Pat. No. 5,109,528, U.S. Pat. No. 5,327,577 and Japanese Translation of Unexamined PCT application No. 10-511835.

While a mobile station communicates with one base station, the radio waves (or carrier) from that mobile station are capable of communicating with other base stations. In CDMA (code-division multiple access), for instance, the number of base stations that can simultaneously connect with a particular mobile station depends on the extent of the interfering power emissions. The power interference is small if there are not many other mobile stations, and using the radio waves (or carrier), a particular mobile station can make simultaneous contact with a plurality of base stations.

Generally, in a radio communications system, the service area of a base station overlaps with adjacent base stations to ensure the continuity of the communications service. Handovers are performed when a mobile station is in these overlapping areas. The mobile station makes a link connection with a plurality of base stations during a handover, and the same data contents are transmitted and received in each link. Transmitting the same data allows obtaining the site diversion effect.

SUMMARY OF THE INVENTION

In order to solve the above and other problems according the first aspect of the current invention, a base station controller to control a plurality of base stations communicating with a mobile station, the base station controller including a radio resource controller for maintaining a plurality of links between the mobile station and each of the base stations that the mobile station is currently reachable, the radio resource controller also maintaining separate information indicative of communication quality of each of the links, a link data rate controller connected to the radio resource controller for determining a data rate for each of the links based upon the communication quality, and a data distributor connected the radio resource controller for distributing communication data among the links to be transmitted at the corresponding data rate.

According to the second aspect of the current invention, a mobile station to be communicated with a plurality of base stations, the mobile station including a radio resource controller for maintaining a plurality of links between the mobile station and each of the base stations that the mobile station is currently reachable, the radio resource controller also maintaining separate information indicative of communication quality of each of the links, a link data rate controller connected to the radio resource controller for determining a data rate for each of the links based upon the communication quality, and a data distributor connected the radio resource controller for distributing communication data among the links to be transmitted at the corresponding data rate.

According to the third aspect of the current invention, a mobile station to be communicated with a plurality of base stations, the mobile station including a plurality of receivers for simultaneously receiving sub frame information from the base stations, the sub frame information indicative of dividing frames of transmission data and data rates, a sub frame generator connected to the receivers for dividing the transmission data into a plurality of sub frames based upon the sub frame information, and a plurality of transmitters connected to the sub frame generator for simultaneously transmitting the sub frames of the transmission data at the data rates.

According to the fourth aspect of the current invention, a method of controlling a plurality of base stations that is communicating with a mobile station, including the steps of maintaining a plurality of links between the mobile station and each of the base stations that the mobile station is currently reachable, maintaining separate information indicative of communication quality of each of the links, determining a data rate for each of the links based upon the communication quality, and distributing communication data among the links to be transmitted at the corresponding data rate.

According to the fifth aspect of the current invention, a method of communicating with a plurality of base stations, including maintaining a plurality of links between the mobile station and each of the base stations that the mobile station is currently reachable, maintaining in the mobile station separate information indicative of communication quality of each of the links, determining at the mobile station a data rate for each of the links based upon the communication quality, and distributing communication data among the links to be transmitted at the corresponding data rate.

According to the sixth aspect of the current invention, a method of communicating with a plurality of base stations, including simultaneously receiving a plurality of sets of sub frame information at a mobile station from the base stations, the sub frame information indicative of dividing frames of transmission data and data rates, dividing the transmission data at the mobile station into a plurality of sub frames based upon the sub frame information, and simultaneously transmitting from the mobile station a plurality of sets of the sub frames of the transmission data at the data rates.

BRIEF DESCRIPTION OF THE DRAWINGS

FIG. 8 is a series of tables delineating typical parameters used in the embodiment.

FIG. 13 is a drawing showing the control sequence between a base station and a mobile station during movement of the mobile station.

DESCRIPTION OF THE PREFERRED EMBODIMENTS

Figure 1:
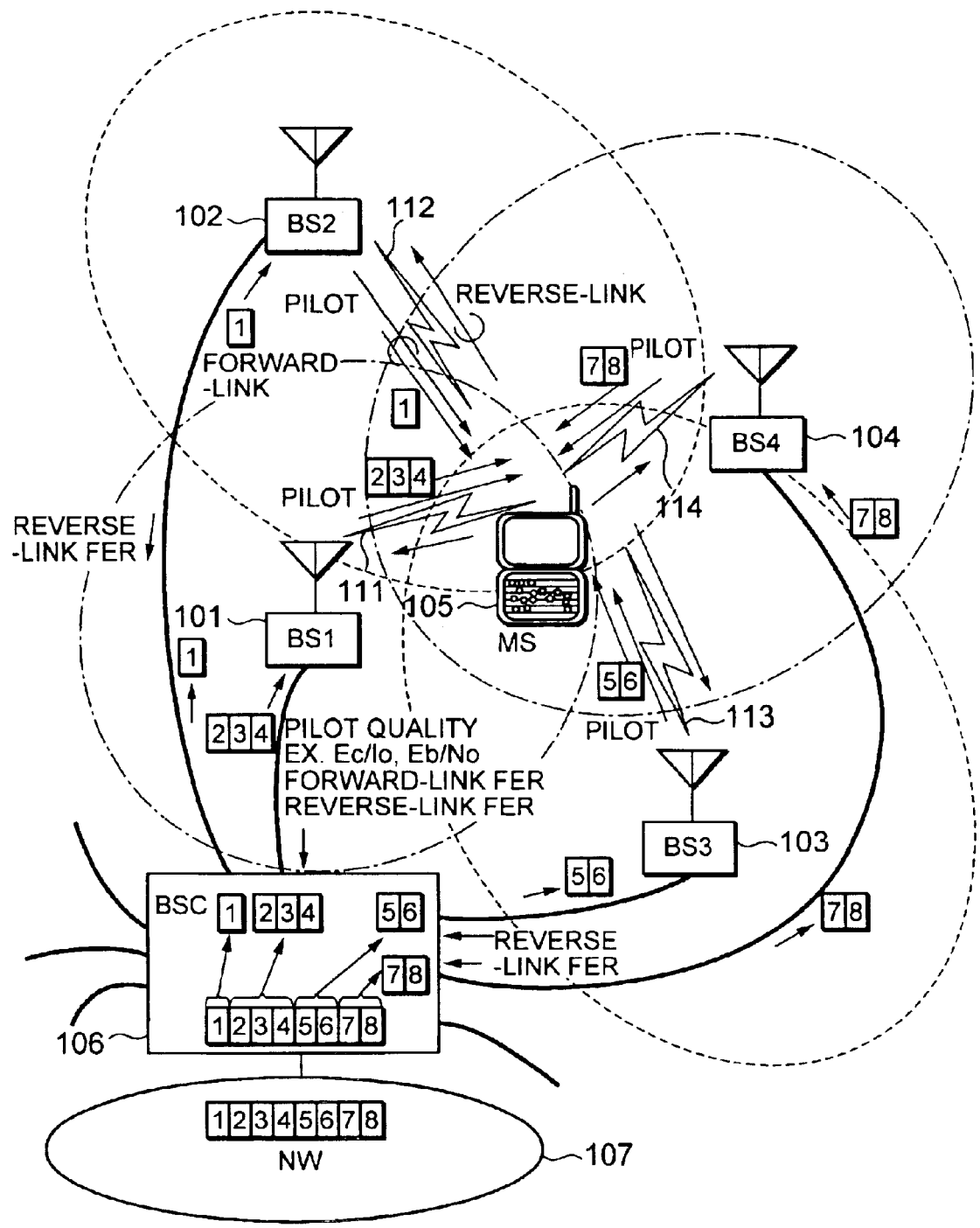
FIG. 1 is a conceptual diagram illustrating an embodiment of the communications system.

The known maximum data rate of a conventional digital communications system is determined by the system modulation method using the ratio of digital signal power to interference noise power (SINR). To indicate the ratio of digital signal power to interference noise power (SINR), ratios such as an $E_b/N_o$ value or an $E_c/I_o$ value is used. The $E_b/N_o$ value is the ratio of the power for one bit of data to the interference noise power density per band. The $E_c/I_o$ value is the ratio of the integrated value Ec across the PN code chip period for the pilot signal power to the density $I_o$ across the total receive power spectrum of the band. Although other scales rather than the above $E_b/N_o$ and $E_c/I_o$ values may be used for showing the channel quality, in the current specification, examples applicable to CDMA are explained by utilizing the $E_b/N_o$ and $E_c/I_o$ values.

The concept of an embodiment of the communication method is first described without referring to any drawing. Parallel transmission may be used with both or either of the forward link and a reverse link in this invention. The data rate of the forward link and the reverse link may also be asymmetrical.

(1) One radio link is set between one base station and one mobile station by means of an access channel in the case of a mobile station transmission and a paging channel in the case of a base station transmission. The radio link setting method here is the same as cellular in the conventional art.

(2) Assuming a request for high speed transmission at a speed that is higher than the designated data rate in a mobile station, a base station or a base station controller and a situation where the mobile station has a transmit or receive capacity by utilizing another channel, the mobile station reports at least the pilot signal power and interference noise power (SINR) of the base station. The report includes the SINR of the base station, the currently receiving mobile station, the base station and the base station controller by means of the link previously setup in the step (1).

(3) The base station controller selects a first candidate for base station in reference to a satisfactory pilot signal power level and based on the report results of the step (2). Next, the radio resources of a first candidate base station are investigated. Another base station that is capable of obtaining a new link is selected as a second candidate. The data rate between the second candidate base station and the mobile station is then determined according to the SINR report of the second candidate base station that is reported to the mobile station.

If the total data rate required by the mobile station or the net side has been predetermined, the total of the data rate of a plurality of links is used to satisfy the required value. The number of communication links that is required to satisfy the data rate requirement should preferably be kept as small as possible from the viewpoint of effectively using communication resources. However, no limit has been set in this invention.

The mobile station refers to a data rate table to find a data rate of the forward link based on the channel quality of the last base station. The data rate of each base station's forward link is reported to the base station controller by the mobile station via a base station. Since the mobile station cannot manage all the radio resources, the mobile station reports to the base station controller the channel quality of each base station. The base station controller sets the data rate of each base station based upon the availability of the corresponding radio resources.

(4) The base station controller reports to the mobile station by means of the link that was established in the step (1) the second candidate base station list and the data rate capable of being allotted to each of the second candidate base stations.

(5) The mobile station sets up a link with one of the second candidate base stations according to the information reported from the base station controller. Except for the case where the number of base stations attempting a new connection is greater than two, this procedure is identical to the procedure during handover.

(6) When setting up of the link is completed, the base station controller provides the mobile station with a setup complete report. The base station controller then demodulates the forward link data according to the data rate of each base station and distributes this data to each base station. The forward link is so-called downstream or forward link transmission from the base station (BS) to the mobile station. Information showing the sequence for assembly is added to the data during the data demultiplexing. The base stations process the demultiplexed data as autonomous signal sequences by modulating the data and sending it to the mobile station. The mobile station separately demultiplexes the data signal received from a plurality of the base stations for each link. The signal sequence is reassembled based on the assembly sequence information, and the original data is restored.

(7) The parallel transmission method for the reverse link is as follows. The reverse link is so-called upstream transmission from the mobile station (MS) mobile station to the base station. The base station controller first determines the reverse link data rate from the receiving level and reports this data rate to the mobile station. The base station controller decides the data rate of the reverse link by referring to the data rate table according to the channel quality of the previously established forward link. The newly established data rate information may be reported to the mobile station by way of at least one base station.

The mobile station also decides the data rate based on the list of candidate base stations reported by the base station controller without determining the reverse link data rate in the base station controller.

The mobile station demultiplexes the reverse link data into a plurality of data according to the data rate of each base station and assigns the data to the respective base stations. Information on the assembly sequence is appended to each piece of data after being demultiplexed. Next, the plurality of split up data is separately modulated and transmitted in parallel to each base station. The demultiplexed data is then demodulated at each base station and transferred to the base station controller. At the base station controller, the signal sequence is reassembled based on the assembly sequence information, and the original data is restored.

To enhance the resistance to errors, error correction encoding and interleaving is performed on the transmission side of the mobile station and the base station controller before distributing the signal to each link. In such cases, the demodulated signal at each base station is rearranged on the receiving side of the base station controller, and deinterleaving, error correction and decoding are performed in the reverse order of the transmission side. The demodulated signal at each receiving port is rearranged, and deinterleaved error corrected and decoded in the reverse order for the transmission procedure in the same way even on the mobile station receive side. Even if the quality of a link seriously deteriorates, the deterioration of channel quality is kept minimum among a plurality of links. After setting up a plurality of links among the mobile station, the base station and the base station controller, any of the links is utilized to transmit and receive the control information between the mobile station and base station controller.

The radio wave propagation between the base station and mobile station changes according to the movement of the mobile station. For this reason, the current links are ended, and new links are set up. Setting up and canceling links are performed to maintain constant communications as required by radio wave propagation and by the user. After establishing the forward link and reverse link, the data rate changes dynamically according to the respective fluctuations in channel quality. Along with these dynamic changes in data rate, the quantity of data that is demultiplexed and assigned to each link also fluctuates.

The hardware structure for implementing the communications method is described next. First, a typical configuration of an embodiment in a cellular system is shown in FIG. 1. A mobile station hereafter abbreviated MS 105 is connected to base stations hereafter abbreviated as BS's 101 through 104 by way of a radio link. Each of the BS's 101–104 is also connected to a base station controller that is abbreviated as BSC 106 by way of a radio link. The BSC 106 is connected to a host network 107. A unique characteristic of this embodiment is that the links 111 through 114 for sending and receiving the information that is demultiplexed into the plurality of BS's 101–104 each function as independent links and information on the line speed is also transmitted. Information is demultiplexed into a plurality of information and transmitted in parallel to allow high speed transmission.

A base station controller (BSC) 106 manages a plurality of the base stations (BS) 101 through 104 for improving a transfer rate of data from the BS's 101–104 to the mobile station 105. When it is necessary to transfer a large amount of data 1–8 from a network 107 to the MS 106, the data 1–8 is transferred to the BSC 106. The BSC 106 maintains a plurality of simultaneous communication links with the BS's 101–104 and also maintains separate information indicative of communication quality of each of the links. Based upon the communication quality, the BSC 106 determines a data rate or a data transmission speed for each of the links with respect to the BS's 101–104. The BSC 106 transmits a corresponding portion of the data 1–8 based upon the previously determined data rate. For example, only a single data portion 1 is transmitted to the BS 102 as its communication quality is poor. On the other hand, multiple data portions 2–4 are sent to the BS 101 as its communication quality is better than that of the BS's 102 through 104.

In this example, the MS 105 is located at a position in an overlapping area of the transmission areas of the BS's 101–104. In other words, at the above described position, the MS 105 is capable of simultaneously transmitting and receiving information from all of the four BS's 101–104. Taking the advantage of this positioning, the base stations 101–104 simultaneously transmit the divided data 1–8 to the MS 105 through multiple links 111–114. Each of the BS's 101–104 respectively transmits via links 111–114 a corresponding portion of the data 1–8 from the network 107.

Because the multiple links 111 through 114 simultaneously utilize the available communication resources according to the feasible data transfer rate, the data transfer rate is substantially improved due to the increased base station utilization.

Figure 2:
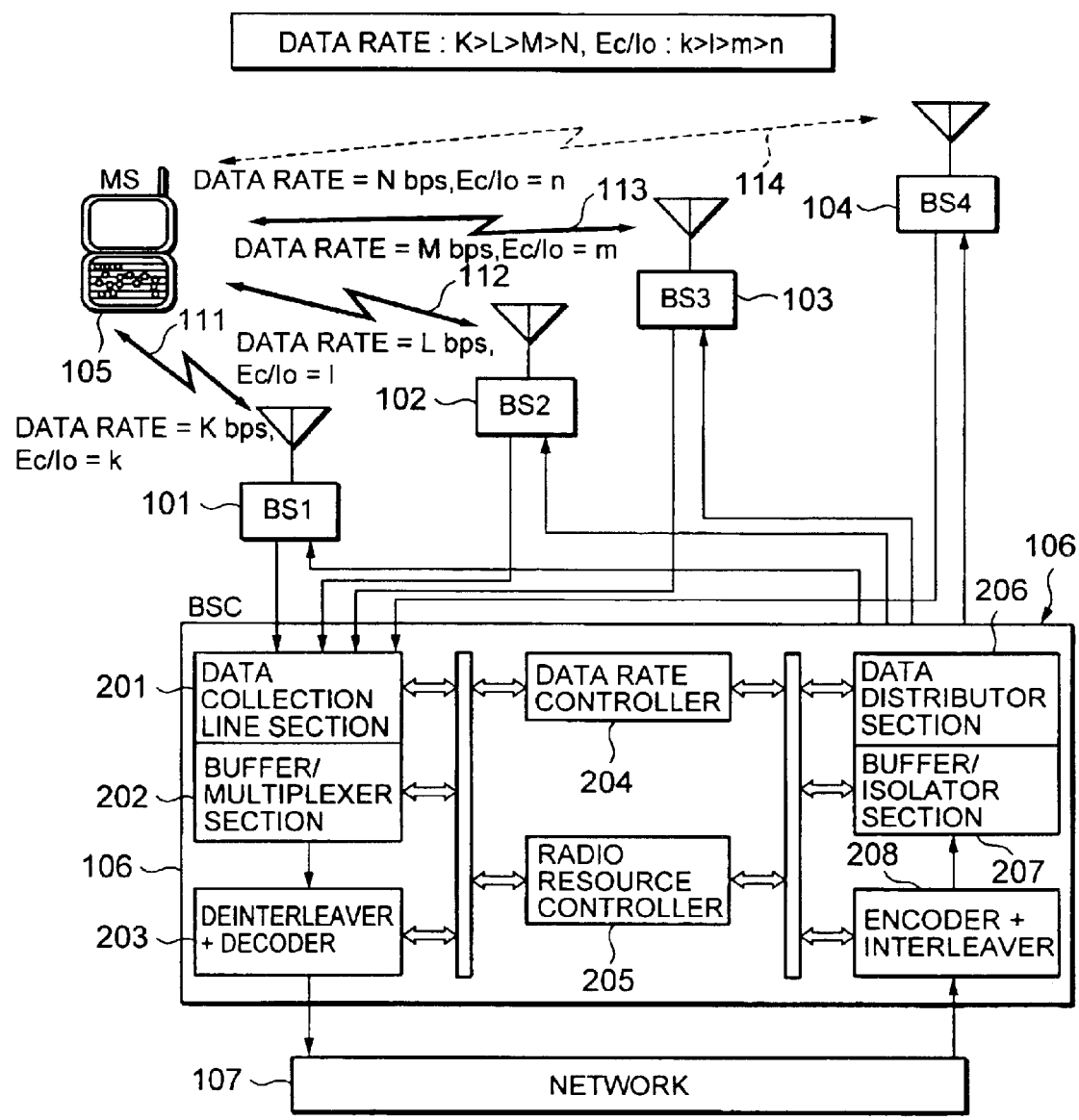
FIG. 2 is a block diagram illustrating a second embodiment of the communications system.

FIG. 2 is a drawing showing more detail of FIG. 1. In FIG. 2, it is assumed that a first $E_c/I_o$ value of a link 111 is the highest, and the link 111 is also assigned the highest data rate. Hereafter, the links 112 through 114 are assigned data rates according to other $E_c/I_o$ values. A mobile station 105 is capable of communicating at a maximum of a data rate of K+L+M+N, subject to interference control conditions between links. Still referring to FIG. 2, the structure of an embodiment of the BSC 106 is next described. The forward link related structures include an encoder+interleaver 208 to encode and interleave data from the network 107, a buffer/isolator section 207 to buffer the data for encoding and interleaving as well as for controlling to isolate the buffered data into a plurality of data according to the data rate of the BS and a data distributor section 206 to distribute the plurality of isolated data to a respective one of the BS's 101–104.

The reverse link related structures, on the other hand, includes a data collection line section 201 to collect control data and traffic data from each of the BS's 101–104, a deinterleaver+decoder 203 to buffer the output of the data collection line section 201 and along with deinterleaving the restored data that was multiplexed and restored in the buffer/multiplexer section 202. The deinterleaver+decoder 203 also performs error correction decoding. The BSC 106 further contains a data rate controller 204 to allot the data rates, and a radio resource controller 205 to manage the radio resources under the BS's 101–104.

The MS 105 establishes a satisfactory $E_c/I_o$ link by connecting to a BS having a pilot signal with a satisfactory $E_c/I_o$ value. Other BS links can also be established if the $E_c/I_o$ of the pilot signal transmitted by the BS exceeds a predetermined threshold value. The predetermined threshold value is a lower limit $E_c/I_o$ value for obtaining a sufficient $E_b/I_o$ to maintain the channel quality and data rate that are required to run the system. Here, the $E_c/I_o$ value of the signals received from BS's 101–104 are sequentially designated as k, l, m, n (k>l>m>n), and the corresponding data rate is set as K, L, M, N (K >L >M >N). The radio resource controller 205 controls the channel quality k, l, m, n, of links 111–114 that is detected by the MS 105 or BS's 101–104. The data rate controller 204 reads out the channel quality of each link stored in the radio resource controller 205 and calculates the possible data rate of each link based on the channel quality. The data rate controller 204 writes information in a table for controlling the data rates for each link and stores the table in the memory storage device. Although a total of four BS's is shown in FIG. 1 and FIG. 2, the number of Bs's is not limited to any particular number.

Figure 3:
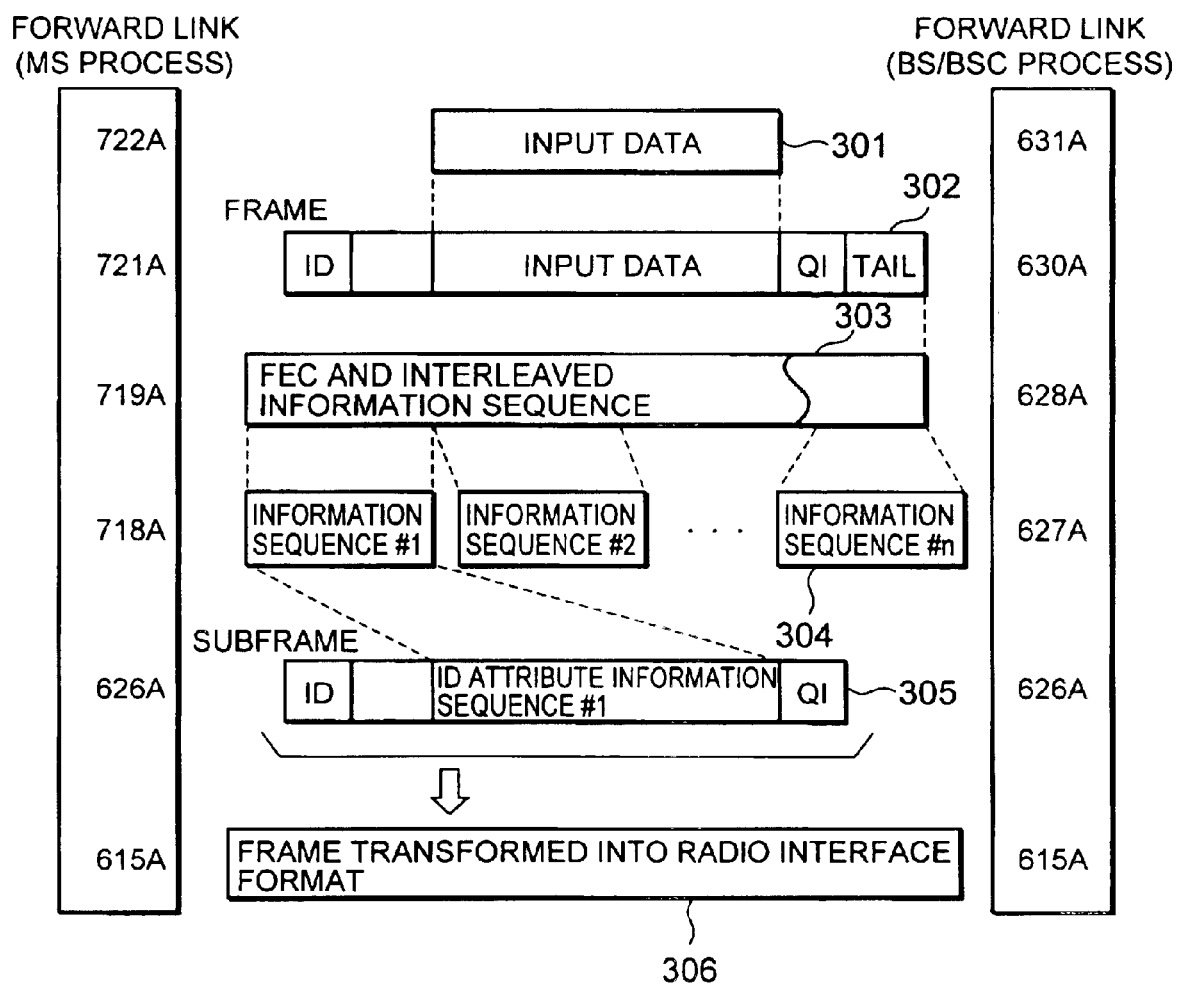
FIG. 3 is a diagram illustrating the second embodiment of the frame structure.

Referring to FIGS. 2 and 3, an example where a BS's transmits to a MS via a forward link is next described. The information from network (NW) 107 forms the structure of a frame 302 which includes input data 301, a frame identifier (ID) and frame type of each specified information length. A tail bit (tail) is further added when the overlap coding is error correction coding. The frame 302 is encoded by the encoder+interleave 208 and forms an encoded sequence or FEC+Interleaved sequence 303. The encoding parameters are specified at this time by data rate controller 204 and the radio resource controller 205. The buffer/isolator section 207 temporarily stores the encoded information sequence. The data distributor section 206 splits up the information sequence stored in the buffer 207 into a plurality of subframes 304. The data length of the subframe 304 is formed according to the data rate of the base station line in the table of the data rate controller 204. For example, the length of the subframe 304 allotted to the link 111 of BS 101 is determined by multiplying K/(K+L+M+N) by the frame length of frame 303 before demultiplexing. The subframe 304 forms a subframe 305 added with the specified frame type and frame identifier (ID) when isolated and sent by the BS. The subframe 305 is transmitted to the BS's 101–104 by the data distribution section 206. Information such as the channel quality information of the reverse link and control information is optionally added at this time to the frame 302 and the subframe 305. The data distribution section 206 designates a particular BS as the distribution destination based on the subframe ID within the subframe 305 and transmits the subframe 305. The specified BS that receives the subframe 305 transmits a radio frequency or carrier containing the subframe back to the MS 105.

Instead of the radio resource controller 205, the data rate controller 204 receives channel quality information such as the $E_b/N_o$ and $E_c/I_o$ of the forward link of each BS as well as frame error rate (hereafter FER) collected in the MS 105. The data rate controller 204 manages the above information. In such a case, the data rate controller 204 above establishes the forward link data rate for each link based on the channel quality stored in the table in addition to storing the quality of each link in the table. The radio resource controller 205 controls the radio resources of each BS and maintains the transmission of each BS under the predetermined transmission capacity.

The MS 105 receives and demodulates the subframe 306 transmitted by each of the BS's 101–104 and restores the frame 303 from the plurality of subframes 305 according to the type and identifier of the demodulated subframe 305. The MS 105 also detects the frame 302 for deinterleaving and error encoding, reproduces the information sequence 301 and restores the original information.

The complete opposite of this procedure is used for the reverse link. Error correction, encoding and interleaving of the transmitted information sequence are performed in the MS 105, and the results are then distributed to the radio ports having modulation circuits and high frequency circuits. These radio ports are equivalent to the radio interface functions of the BS for the forward link. The data distribution of the reverse link is determined by the MS based on the $E_b/I_o$ value of each BS. However, when a new link is established, the pilot signal from the BS for setting the link is monitored, and the data rate is determined by the $E_c/I_o$ value.

The data collection line section 201 collects the received reverse link information as the format for the subframe 305. The data collection line section 201 also extracts necessary control information for controlling channel quality such as the forward link FER. The buffer/multiplexer section 202 temporarily stores the subframe 305 in the memory and assembles the encoded sequence 304 according to the type and the identifier of the subframe 305. The decoder 303 deinterleaves and decodes the sequence 304. Finally the quality of the decoded data is checked for each frame and sent to the NW 107. The data rate of each link however is not usually a fixed speed. The data rate controller 204 recalculates the data rate according to changes in the channel quality as the changes are reported.

1. System Structure

Figure 4:
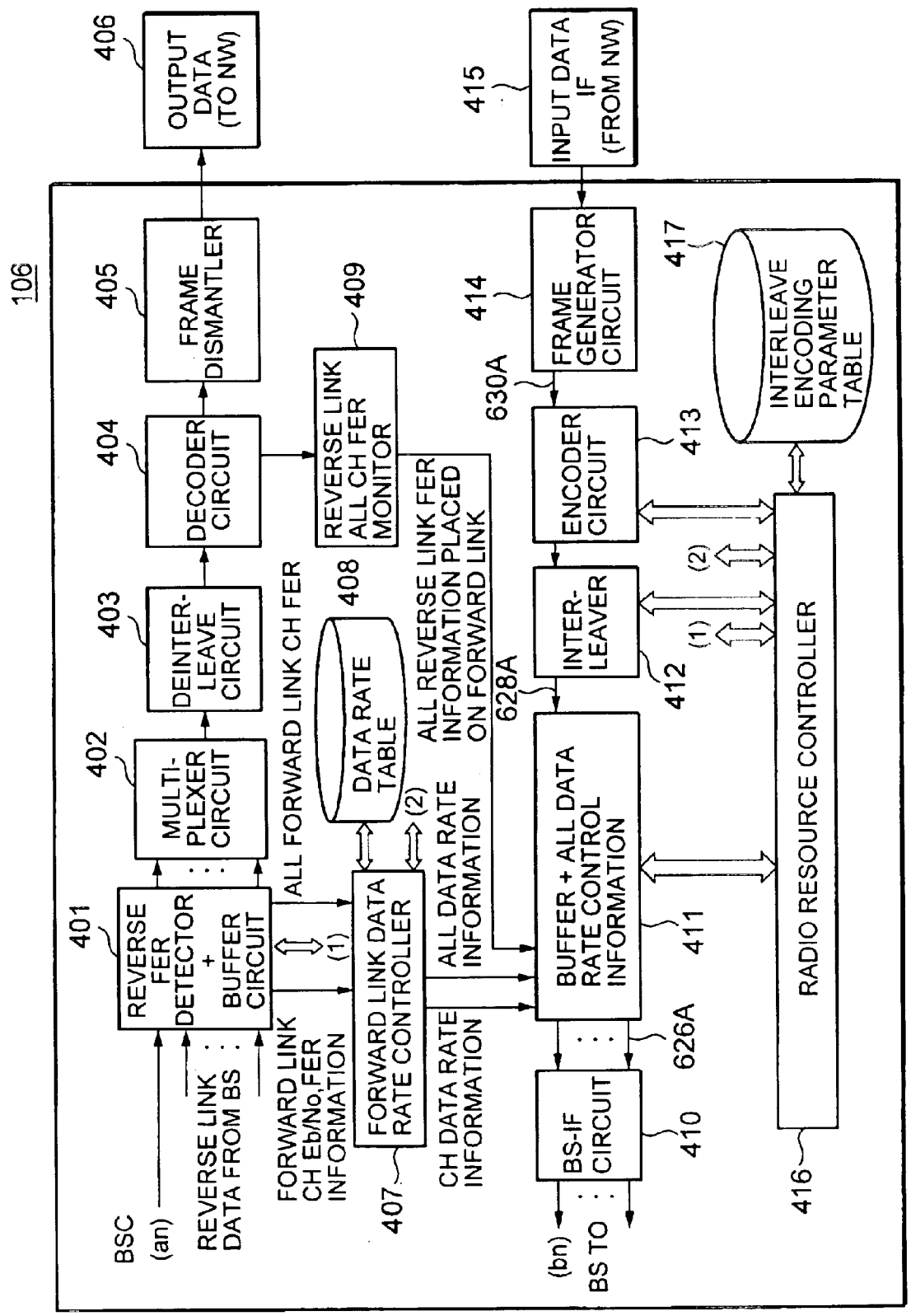
FIG. 4 is a block diagram illustrating a typical configuration of an embodiment of the base station controller.

The BSC structure is described in more detail with respect to FIG. 4. The BSC 106 is comprised of an reverse FER detector+buffer circuit 401, a multiplexer circuit 402, a deinterleave circuit 403, a decoder circuit 404, a frame dismantler 405, an output data interface 406, a forward link data rate controller 407, a data rate table 408, a reverse all channel FER monitor 409, a BS-IF circuit 410, a buffer+all data rate control information 411, an interleaver 412, an encoder circuit 413, a frame generator circuit 414 an input data I/F 415, and an interleave encoding parameter table 417, etc.

Figure 5:
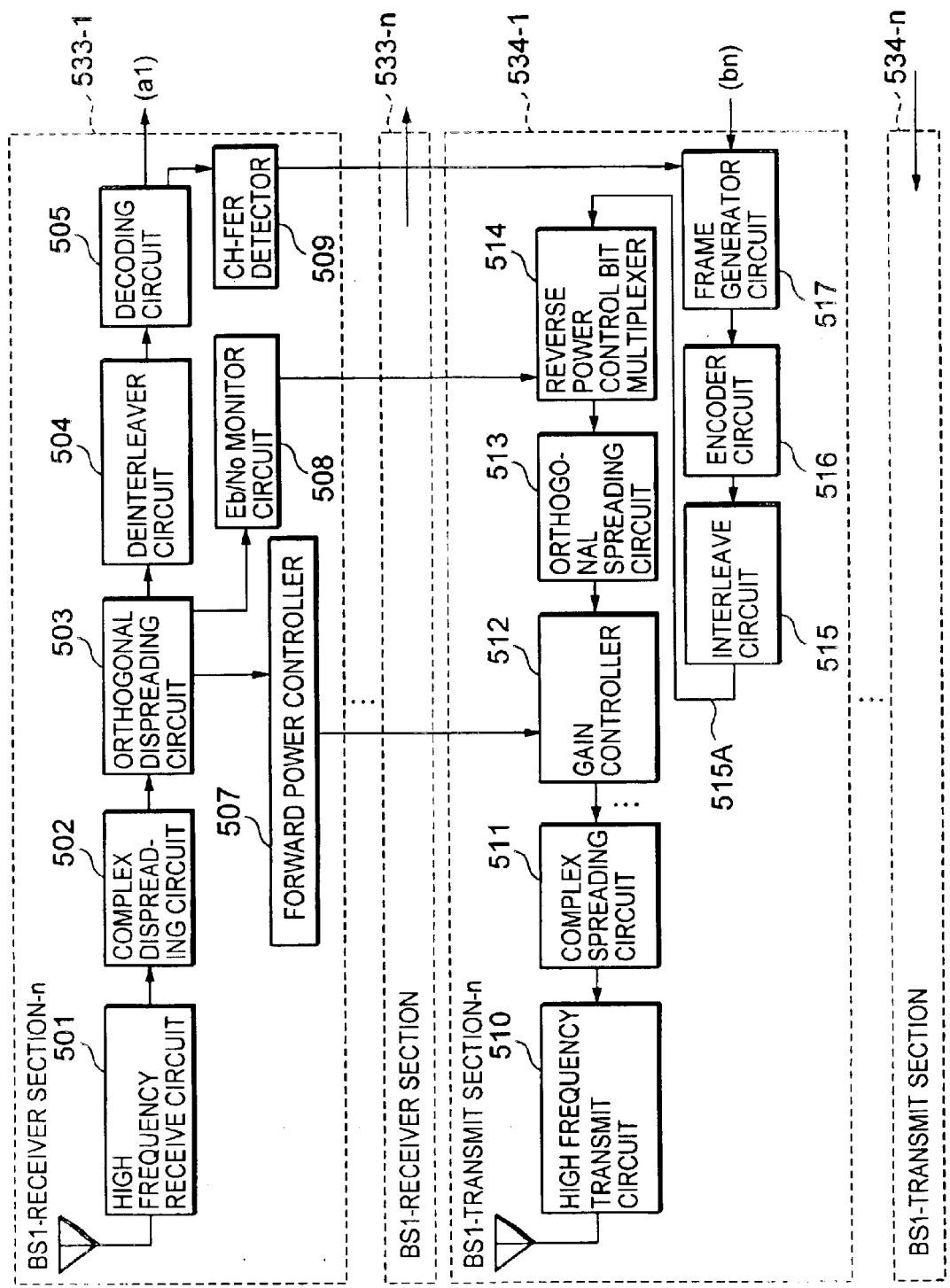
FIG. 5 is a block diagram illustrating a typical configuration of an embodiment of the base station.

FIG. 5 is a block diagram illustrating an embodiment of the BS. The BS includes a plurality of receiver sections 533-1 through 533-n and a plurality of transmit sections 534-1 through 534-n to communicate with a plurality of mobile stations. Each of the BS receive sections 533-1 through 533-n includes of a high frequency receive circuit 501, a complex dispreading circuit 502, an orthogonal dispreading circuit 503, a deinterleaver circuit 504, a decoding circuit 505, a forward link power controller 507, an Eb/No monitor circuit 508, and a channel FER detector 509. On the other hand, each of the transmit circuit sections 534-1 through 534-n includes a high, frequency transmit circuit 510, a complex spreading circuit 511 a gain controller 512, an orthogonal spreading circuit 513, a reverse power control bit multiplexer 514, an interleave circuit 515, an encoder circuit 516, and a frame generator circuit 517.

Figure 6:
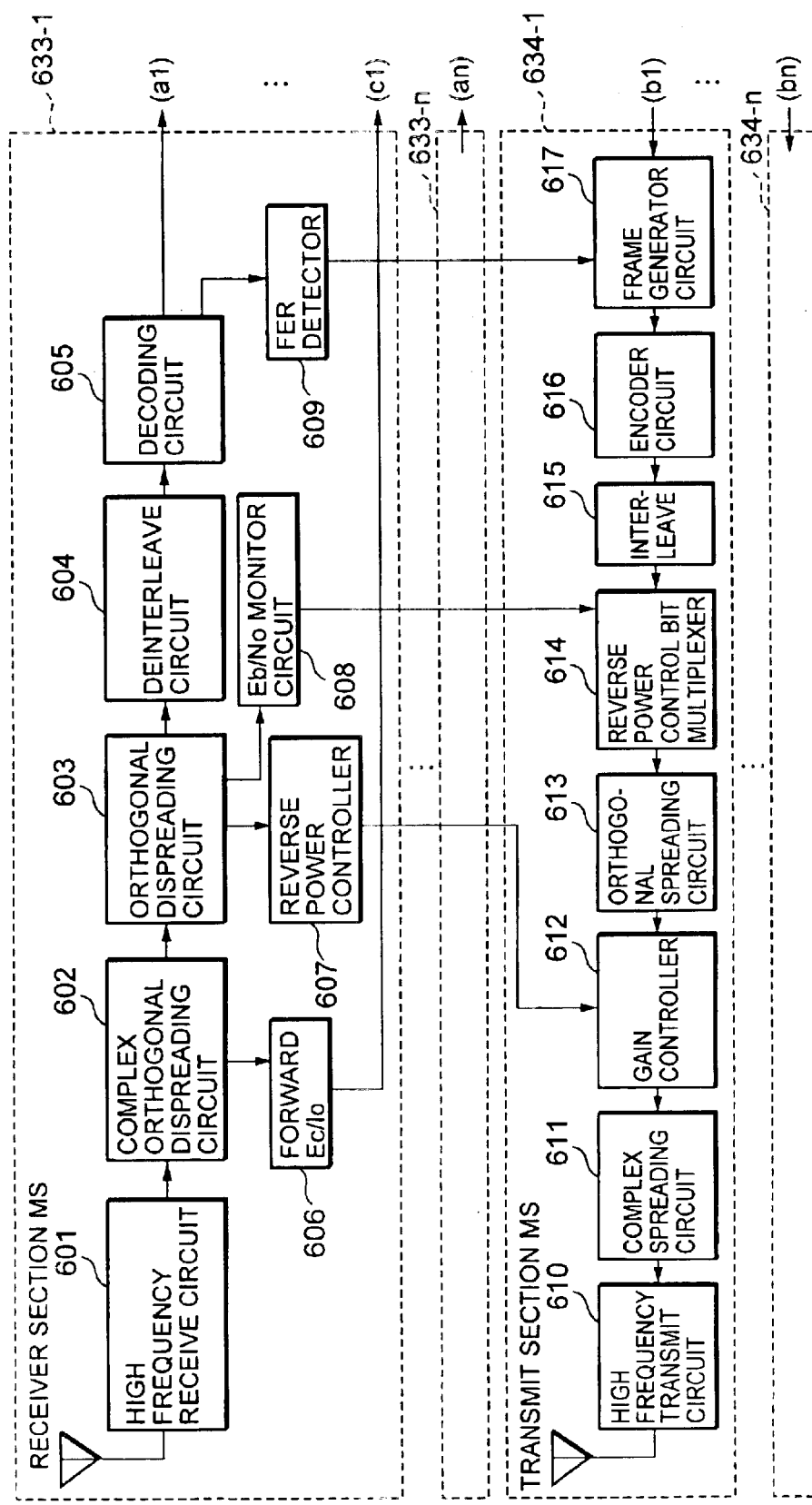
FIG. 6 is a diagram illustrating a typical structure of an embodiment of a mobile station.

The structure of an embodiment of the mobile station is shown in FIG. 6. The MS 105 includes a plurality of receiver sections 633-1 through 633-n and a plurality of transmit sections 634-1 through 634-n to communicate with a plurality of BS's. Each of the MS receive circuit sections 633-1 through 633-n includes a high frequency receive circuit 601, a complex orthogonal dispreading circuit 602, an orthogonal dispreading circuit 603, a deinterleave circuit 604, a decoding circuit 605, a forward link $E_c/I_o$ 606, a reverse power controller 607, an $E_b/N_o$ monitor circuit 608, and an FER detector 609. On the other hand, each of the transmit circuit sections 634-1 through 634-n includes a high frequency transmit circuit 610, a complex spreading circuit 611, a gain controller 612, an orthogonal spreading circuit 613, a reverse power control bit multiplexer 614, an interleaver 615, an encoder circuit 616, and a frame generator circuit 617.

Figure 7:
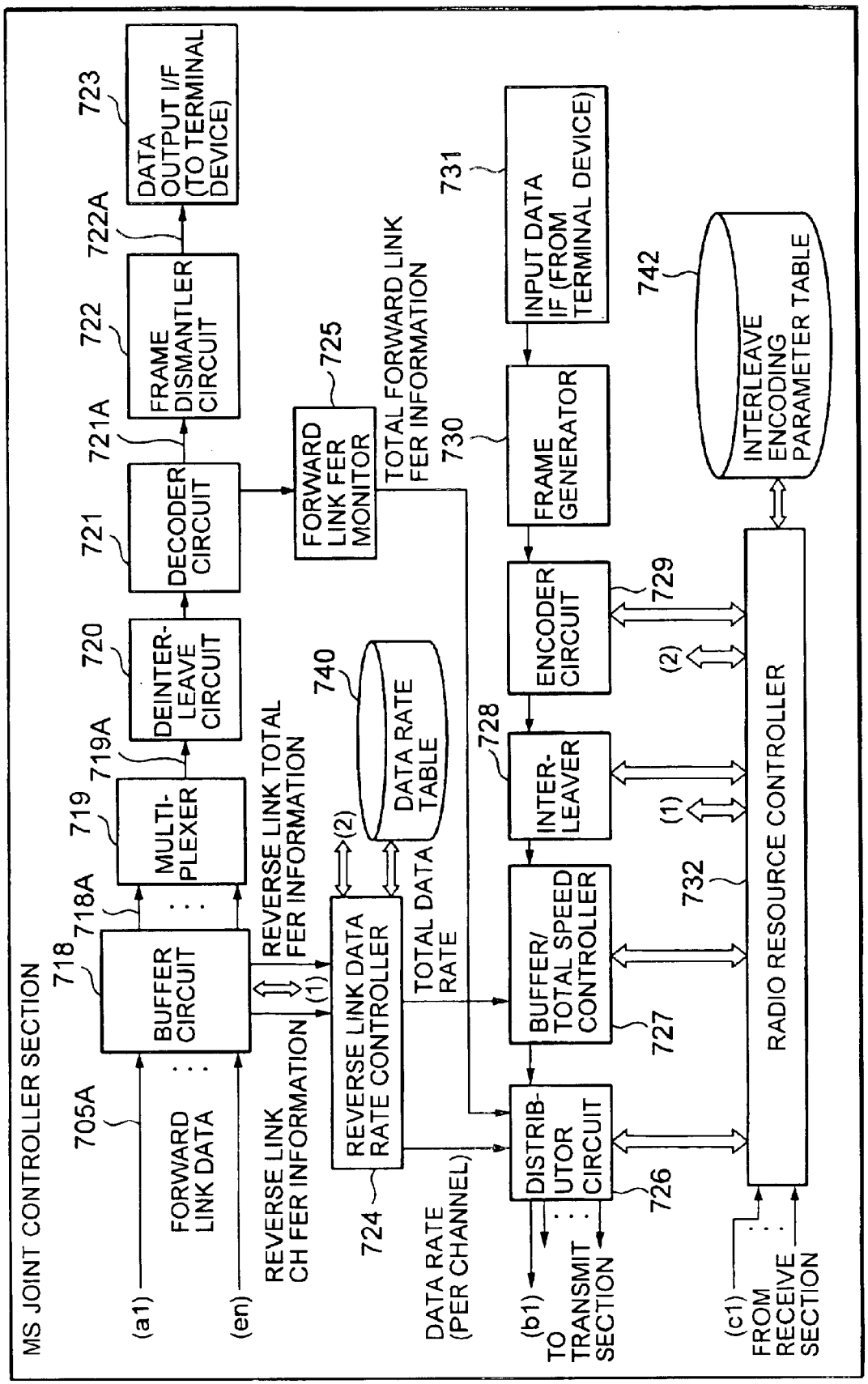
FIG. 7 is a diagram illustrating a typical structure of an embodiment of a mobile station.

Referring to FIG. 7, a block diagram illustrates an embodiment of a MS joint controller section 735. The MS joint controller 735 includes a buffer circuit 718, a multiplexer 719, a deinterleave circuit 720, a decoder circuit 721, a fame dismantler circuit 722, a data output I/F 723, a reverse link data rate controller 724, a forward link FER monitor 725, a data rate table 740, a distributor circuit 726, a buffer/total speed controller 27, an interleaver 728, an encoder circuit 729, a frame generator 730, an input data IF 731, a radio resource controller 732, and an interleave encoding parameter table 742.

2. System Operation

The operation of the forward link is described next with respect to FIGS. 3 and 4. The frame generator circuit 414 for the BSC demultiplexes the input data 301 from the network into frames and further adds on the receiver side, a signal necessary for identifying the information as shown in a step 630A. The encoder circuit 413 performs error correction encoding of the output of the frame generator circuit 414. The interleaver 412 performs interleaving by changing the permutation of the information in a step 628A. The radio resource controller 416 supplies the interleaving parameter to the interleaver 412 and the encoding parameter to the encoder circuit 413 at this time.

Subsequently, the buffer+all data rate control information 411 sums each data rate of the plurality of the BS's connected with the MS 105 to find the total data rate. The forward link data rate controller 407 calculates the data rate of each link based on the $E_b/N_o$ or $E_c/I_o$ and each frame error correction rate (hereafter FER) that has been reported to the MS 105 by way of the reverse link. The data rate is controlled by taking the usage conditions for radio resources of all BS's into account. The BS-IF circuit 410 allots signals to the corresponding BS based on the identifier of each subframe as shown in a step 626A.

Now referring to FIGS. 5 and 6, the BS include a plurality of forward link transmit sections 534-1 through 534-n where n is a natural number of 2 or more. The frame generator circuit 517 performs framing so that the radio interfaces between the BS's and the MS are compatible 627A. The encoder circuit 516 performs error correction encoding of the output of the frame generator circuit 517. The interleave circuit 515 changes the permutation data for performing interleaving as shown in a step 615A.

The reverse link power control bit multiplexer 514 adds power control information to the output from the interleaving circuit 515. The orthogonal spreading circuit 513 cross-modulates the output from the interleaving circuit 515. The gain controller 512 adjusts the transmit power gain. The complex spreading circuit 511 implements complex spreading of information whose transmit power gain was adjusted. The high frequency circuit 510 converts the information after complex spreading into a transmit frequency signal and transmits the converted signal to the MS.

Referring to FIGS. 6 and 7, the MS forward link structure and functions are next described. The MS 105 has a plurality of receivers 633-1 through 633-n where n is a natural number of 2 or more. Each of the receivers 633-1 through 633-n is capable of simultaneously receiving a plurality of links. Each of the receivers 633-1 through 633-n operates independently. The complex orthogonal dispreading circuit 602 orthogonally dispreads the signal that is received by the high frequency receive circuit 601 with a dispreading code that matches the BS which has transmitted the signal. The complex orthogonal dispreading circuit 602 collates the cells. The orthogonal dispreading circuit 603 next performs orthogonal dispreading on a desired channel to isolate and identify the desired channel. Error correction of the isolated channel signal is performed by the deinterleaver circuit 604 and the decoding circuit 605. Each of the receivers 633-1 through 633-n contains an Eb/No monitor circuit 608 for monitoring the Eb/No value of the signal after orthogonal dispreading, an FER detector 609 for detecting the FER of the signal after decoding, and a reverse power controller 607 for controlling the power of the reverse link by using the monitored Eb/No and FER.

The MS joint controller 735 collects the receive data or subframe 705A from each receiver in a buffer circuit 718 and adjusts the timing of each receive data. The multiplexer 719 multiplexes the receive data whose timing was adjusted. The multiplexer 719 reads the type and the ID contained in the subframe 705A and further checks the quality (QI). The ID is sequence information for multiplexing the signal received with the plurality of links. The type is information for categorizing items such as the control signal and traffic data. The signal processing order is determined based on the type information. Since ID and the type information other than the sequence information is contained in a subframe 718A, the multiplexer 719 extracts only the sequence information sequence and performs multiplexing. The deinterleave circuit 720 of the MS joint controller 735 implements a deinterleaving operation to restore the permutations of the multiplexed data 719A to the original form. The decoder circuit 721 performs error correction decoding on the data after deinterleaving and reproduces the frame 721A. The frame dismantler circuit 722 disassembles the frame 721A, and eliminates overhead such as the ID, extracts the original data 722A and transmits it to the MS data processor. In this process, the forward link FER monitor 725 detects the FER based on the output 721A from the decoding circuit 721 of each forward link. The FER information of the detected forward link is reported to the BSC by the reverse link.

Still referring to FIG. 7, a description for the reverse link or MS transmission is given next. The frame generator circuit 730 of the MS 105 disassembles the data input from the MS into a plurality of data and generates a frame. The permutations of the information of the frame that were error corrected and encoded in the encoder 729 are changed in the interleaver 728. The encoding parameters and interleave parameters are supplied at this time to the encoder 729 by the MS radio resource controller 732. The buffer/total speed controller 727 determines the total transmission data rate of all information by adding all the reverse link data rates set by the reverse link data rate controller 724. The reverse link data rate controller 724 determines the data rate for each channel based on the reverse link total FER that is received via the forward link and the FER or the $E_b/N_o$ of each reverse link. This control may be implemented while taking into account the usage status of all BS radio resources in terms of time slot, encoding and frequencies of connectable links with the MS. Signals corresponding to the BS are subsequently assigned by the distributor circuit 726. One transmitter is assigned to each BS in a ratio one to one. Referring to FIG. 6, in each of the MS transmitters 634-1 through 634-n, framing is performed by the frame generator circuit 617 to match the radio interfaces between the MS and BS. Each of the MS transmitters 634-1 through 634-n separately modulates and transmits each BS isolated signal. In the example, error correction encoding is performed by the encoder circuit 616. Permutations is changed by the interleave circuit 616. Power control information is added to the data by the reverse link power control bit multiplexer 614. Cross modulation is performed by the orthogonal spreading circuit 613. The transmit power gain is adjusted in the gain control circuit 612. After modulation by the complex spreading circuit 611, the modulated signal is converted to a high Frequency signal by the high frequency circuit 610 and transmitted to the BS.

Referring to FIG. 5, the elements and the functions of the BS and the BSC reverse link receive structure are explained next. A plurality of receivers 533-1 through 533-n is provided in the BS to simultaneously receive a plurality of links. Each of the receivers 533-1 through 533-n operates independently. The complex dispreading circuit 502 performs complex dispreading of the signal that is received by the receive high frequency circuit 501 for synchronization with the MS transmit signal. Next, the orthogonal dispreading circuit 503 performs orthogonal dispreading of the information after the above complex dispreading and identifies the channels. The deinterleaver circuit 504 and the decoding circuit 505 perform error correction after the above orthogonal dispreading. The receiver contains a forward power control circuit 507, an $E_b/N_o$ monitor circuit 508, and an FER detector 509 to monitor and control the power.

Now referring to FIG. 4, the output from each BS receiver is collected in the reverse FER detector+buffer circuit 401 of the BSC 106. The timing of the receive data is adjusted by the reverse FER detector+buffer circuit 401. The multiplexor circuit 402 multiplexes each receive data. The multiplexed data still has been interleaved by the interleave circuit 728 of the MS joint controller 735 as shown in FIG. 7. The deinterleaving circuit 403 of the BSC at that point restores the permutations back to the original form. Error correction of the deinterleaved signal is implemented by the decoding circuit 404. The frame dismantler circuit 405 next extracts the original data 406 and sends that output data 406 to the NW. The reverse link FER monitor circuit 409 detects the FER of all reverse links based on the output of the decoding circuit 404. The FER information is transmitted to the MS 105 by the forward link via the BS.

In the above description, the high frequency circuits of the BS and the MS transmit/receivers are individually set, and the links between the MS and a plurality of the BS's are established at different frequencies as a precondition. If time division multiple access(TDMA) is applicable here, identification may be performed according to the time slot and the links allotted for utilizing the same frequency. In the access method such as CDMA where a plurality of links can be established on one frequency, the operation on a single frequency is possible by using an interference control such as time slot reservations for first of all transmit and receive signals.

3. Data Rate Control Method 3.1 Forward Link

The MS 105 selects a link with a first BS having the most satisfactory $E_b/N_o$ value, by connecting to a first BS having the most satisfactory $E_c/I_o$ 16 value pilot signal. If the $E_c/I_o$ of the pilot signal transmitted by a second BS exceeds a lower limit of the $E_b/N_o$ value required for maintaining the channel quality and the data rate necessary for system operation, parallel communication is also possible with the second BS. The current invention assumes at this time that CDMA is used so that when the MS is simultaneously received by a plurality of BS's. The current invention also assumes that the data rate constituting interface may drop. But if the link (slot) reservation method is used, then the data rate improves. However, in consideration of application of other methods such as TDMA, it is assumed that interference is suppressed to a non-harmful level for the system operation by frequency or time sharing between links among the MS and plurality of the BS's. It is also assumed that the signals are adequately isolated.

The method for setting the link is shown below.

(1) The MS 105 determines the $E_c/I_o$ value of the pilot signal from each BS and decides the order of priority of connection candidates among a plurality of the BS's based on the $E_c/I_o$ values.

(2) The MS 105 attempts a connection by access channel with the BS 101 having the highest priority.

(3) When the connection with the BS 101 is complete, the MS 105 along with requesting reception of data by way of the BS 101 also reports the BS 102 and the BS 103 pilot signals with a high order of priority after the BS 100 for the connection and their $E_c/I_o$ value to the BSC 106. The MS 105 together reports the supported frequencies, encoding channels, the transmission/receiving data rate, as well as supportable link types such as control link types.

(4) The BSC 106 identifies the BS that is connectable with the BS 102 and the BS 103 from the ID of the pilot signal and verifies in the radio resource control table whether or not the BS 102–BS 103 radio resources are allotted to the MS 105.

(5) When the BSC 106 confirms that the BS 102–BS 103 radio resources are allotted to the MS 105, the BS 102–BS 103 ID (pilot signal) and the assigned link (frequency, encoding, timing) and the data rate are reported to the MS 105 via the currently connected BS 101. When it is not possible to confirm, a standby (wait) condition is set, and the above processes in (3) through (4) are repeated. If the standby or wait condition is not canceled even after a preset time has elapsed, a time-out occurs, and the connection that is processing data for the plurality of links is terminated.

(6) The MS 105 establishes receiving-links that are specified by the BS 102 and the BS 103.

(7) The MS 105 commences receiving signals through the links that is is specified by the BS 102 and the BS 103.

(8) The BSC 106 selects an error encoding method and interleaving parameters according to the data rate of each BS. The BSC 106 performs encoding and distributes the signal to each BS. Each BS transmits the information that is distributed from the BSC 106 by way of the links secured with the MS 105.

(9) The MS 105 monitors the receive quality of each link during communication. The monitor parameters are for each of the BS's 101, 102 and 103 and include respective the $E_b/N_o$, FER and FER values after multiplexing. The MS 105 reports these values to the BSC 106 at the preestablished time intervals by using a dedicated control channel. The MS 105 also checks for the appearance of a newly connectable BS by monitoring the $E_c/I_o$ value. When a newly connectable BS appears, the MS 105 reports the information on the newly connectable BS to the BSC 106 by way of the currently connected BS 101.

(10) The BSC 106 adjusts the data rate based on the monitored parameters indicative of the channel quality such as the $E_b/N_o$ value that is reported from the MS 105 or the FER. The data rate is lower when the channel quality deteriorates. Conversely, after the channel quality has improved, the data rate is raised. The FER quality after multiplexing has a-more effect in adjusting the data rate.

(11) When the data rate on a particular link is reduced to a predetermined low limit and the specified quality is still not maintained, then that particular link is terminated. The communication is continued by the remaining links.

(12) The normal handoff is not performed. Only the connection and termination of links is performed. However, a normal handoff may also be used for more stable communications.

3.2 Reverse Link

The link setup method will be described next.

(1) The MS 105 receives the pilot signal of each BS, measures the in respective $E_c/I_o$ value, and establishes a connection priority order for each BS based on the $E_c/I_o$ value. If the BS is not possible for connection, it is not assigned an order of priority. Alternatively, its order of priority is lowered if the BS has been already connected.

(2) The MS 105 attempts a connection via access channel with a desired one of the BS 101.

(3) When the MS 105 connects with the BS 101 and requests for transmitting data via the BS 101, the MS 105 also reports to BS's 102 and 103 via pilot signal of the BS 101 a high order of priority after the BS 101 connection. Similarly, the MS 105 reports their $E_c/I_o$ to the BSC 106.

(4) The BS 106 prepares a connection with the BS's 102 and 103 based upon the pilot signal ID. It is verified whether or not the BS's 102 and 103 radio resources would be allotted to the MS 105.

(5) When the BSC 106 decides that the BS's 102–103 radio resources are allotted to the MS 105, the BS 102-ID (pilot signal), the assigned link (frequency, encoding, transmission timing) and data rate are reported to the MS 105 by way of the currently connected BS 101. When not possible to report, a standby or wait condition is set, and the processes in (3) through (4) are repeated. A time out may occur according to circumstances.

(6) The MS 105 establishes transmission on the links that are specified by the BS's 102 and 103.

(7) The MS 105 starts transmitting on the links that are specified by the BS's 101, 102, and 103.

(8) The BSC 105 selects an error encoding method and interleaving parameters according to the specified data rate. The BSC 105 performs encoding, distributes the signal to each BS, and commences transmission.

(9) The BSC 106 monitors the receiving quality on the reverse link for each BS. The monitor parameters include the respective $E_b/N_o$ value, FER and the FER after multiplexing for the signal that is received on the BS's 101, 102, 103. The BSC 106 reports these values to the MS 105 at pre-established time intervals via a control channel. The MS 105 monitors the $E_c/I_o$ value of other. pilot signals. When monitoring results show that a newly connectable BS appears, the information on the newly connectable BS is reported to the BSC 106.

(10) Even after the communication is started, the MS 105 adjusts the data rate based on the monitor parameters that is reported by the BSC 106. For instance, when it is decided from the monitor parameters that the channel quality of the designated BS has deteriorated, the data rate of the corresponding BS is lowered. Conversely, the data rate is raised when the channel quality is improved. The FER quality after multiplexing is predetermined to have more influence in adjusting the data rate.

(11) After the data rate on a particular link is reduced to the lowest limit, if the specified quality still cannot be maintained, the link is terminated and communication is continued by the remaining links.

(12) When data rate has priority, handoff is not performed and only the connection and termination of links are performed. However, a normal handoff is used for more stable communications.

4. Setting Method for Data Rate

The data rate per link or unit is determined based on the SINR (signal-to-interference-noise-power-ratio). The data rate is also determined by calculation or using a table that was prepared beforehand to contain information on the mutual relation between the data rate and the signal-to-interference-noise-power ratio (SINR. An example of the above table is shown in FIG. 8(a).

Referring to FIGS. 4 and 7, the information table is stored in the memory circuit 408 or 740, and the information content is controlled respectively by the forward link data rate controller 407 and the reverse link data rate controller 724. In addition to determining the data rate (used as the reference), the forward link data rate controller 407 and the reverse link data rate controller 724 also change the data rate according to an amount of fluctuation in channel quality. The actual channel quality is generally rated according to the FER. The FER is also listed in FIG. 8(a). The channel quality parameter settings such as FER, $E_c/I_o$, $E_b/N_o$ are updated during link setups or calls.

The data rate after multiplexing is supplied as the total sum of the available link data rates. However, the interference between the available links must also be taken into account at this time. In other words, since interference occurs between or among links when the same time slots or the same frequencies are utilized between different links, the channel quality will probably be unsatisfactory due to deterioration in the FER. The table shown in FIG. 8(b) therefore has an interference surplus coefficient used as a margin. When using the same channel or the same time slot on a plurality of channels, this interference surplus coefficient is utilized to provide a mutual interference margin. This table is also stored in the memory circuit of the forward link data rate controller 407 or the reverse link data rate controller 724.

Still referring to FIGS. 4 and 7, for interleaving between links in the interleaving circuits 412 or 728 even after isolating information per the links, the interleave size must be set to adequately suppress burst error deterioration due to fading. The interleave size is therefore adjusted according to the data rate ratio between the links and the number of isolated links. An interleave size parameter table is shown in FIG. 8(c). The encoding system parameters such as forced length and encoding rate are adjusted in order to raise the channel quality by means of the encoding gain. The interleave and encoding system parameters are stored in the memory circuit of the radio resource controller 407 or 732.

5. Distribution Method for Transmitted Data

Referring to FIG. 3, the input data 631A demultiplexed into frame lengths is added with an ID to identify the frame, a type or attribute, channel quality indicator (QI) and a tail bit for the FEC as shown in 630A. This frame becomes an interleaved sequence 628A after adding redundancy to the frame by means of the FEC. The sequence 628A is demultiplexed into a plurality of data sequences according to the data rate that was previously determined. Channel quality indicators such as the order of the sequence. ID supplying the address, type or attribute supplying the data type information, and CRC are added to each information sequence to form a subframe 626A that were transmitted from the BSC 106 to the BS. The destination for distributing the information sequence 627A is decided by utilizing the minimum period or unit as the unit necessary for verifying the channel quality and controlling the period so the respective line qualities for BS and MS match the data rate as shown in FIG. 8.

When the data rate on a link drops due to fluctuations in the channel quality, the buffer circuit 411 places the data transmission to a standby or wait status. In such a case, when the data rate of other links has a surplus with respect to the maximum allowable transmission speed, other links are switched for use and the transmission standby (wait) status is not set.

Figure 9:
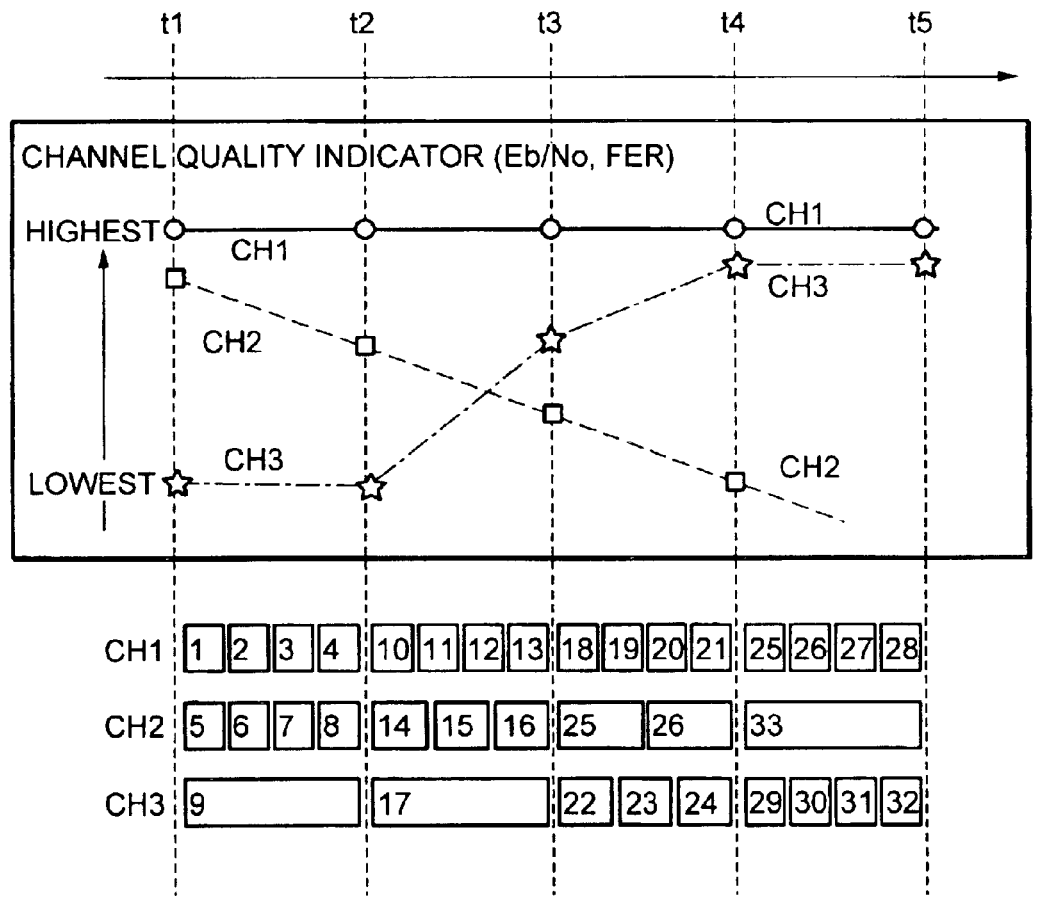
FIG. 9 is a graph illustrating a relation between the channel quality and the link data rate of the embodiment.

Referring to FIG. 9, the data rate and a typical signal distribution are shown for a link that has been set up between three BS and one MS. Four data blocks of interleaved data are illustrated for transmission during each time interval (tn and tn+1 time interval) for rating the channel quality at the maximum data rate per one link. The minimum data rate is the time interval in which one data block is sent per each time interval. This data rate is determined by the channel quality rating parameters such as FER, $E_c/I_o$, $E_b/N_o$ as shown in FIG. 8. In CH1, it can be noted that between times t1 through t5, the channel quality is always at the highest level so the data rate also becomes a maximum. In CH2 on the other hand, the channel quality has deteriorated over time from time t1 to t5, and the data rate also deteriorates in proportion to the channel quality. In CH3, the channel quality is minimal at the time t1 through t2, and accordingly only one data block can be sent. However at time t3, the channel quality has improved so that three data slots are now sent.

After interleaving of the transmission data, data with a satisfactory channel quality is given a certain priority for distribution and transmitted first. Priority data is sent in this way to transmit as many signals as possible and as fast as possible after receiving the channel quality data (FER, $E_c/I_o$, $E_b/N_o$).

Figure 10:
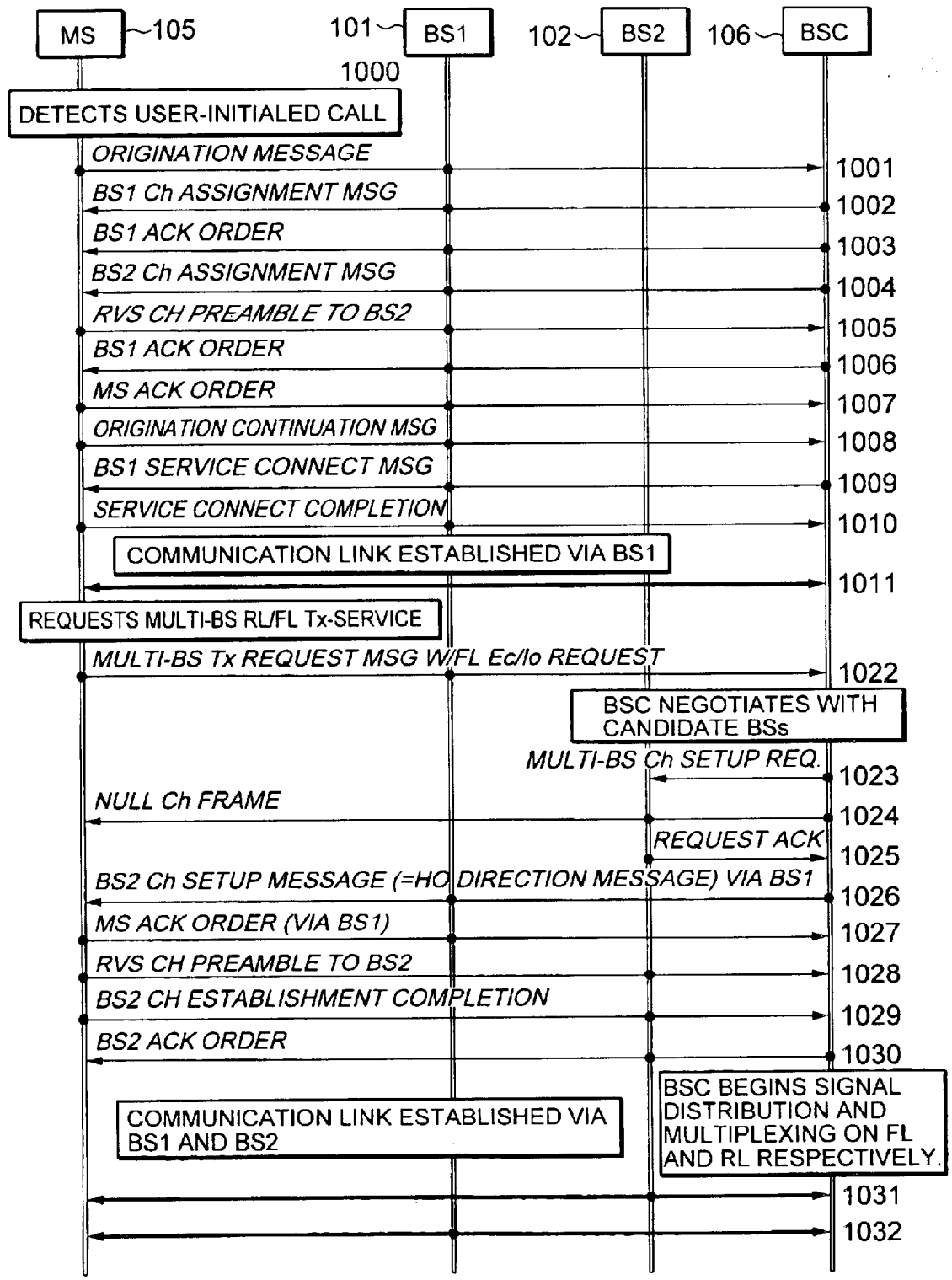
FIG. 10 is a diagram illustrating steps involved in the link setup sequence during a MS call-up.

Referring to FIG. 10, the operation is illustrated for a situation when the MS 105 is called up and a plurality of links are established. When a MS call-up request has been made at a step 1000, the call-up request is transmitted by the MS 105 to the BS 101 by way of an access channel in a step 1001. This access channel is capable of being received by a plurality of BS's. If a plurality of access channels receives signals from the BS and is formed per the BSC 106 in the same manner as other traffic channels, call-up requests are made through this plurality of access channels.

Still referring to FIG. 10, when traffic channels are set up between the MS 105 and BS 101, it is assumed that communication service has started in steps 1002–1011. In this example, it is assumed that the link with BS 101 alone has an insufficient capacity to upload information from MS 105. The MS 105 makes a request for a high speed transmission service to BS 101 by multi-BS transmission in a step 1022. At this time, the MS 105 transmits a statistic list on the BS pilot signals it is receiving. The list shows pilot signals with a receive level below a specified value and their intensity as indicated by an $E_c/I_o$ value to BSC 106 in a step 1022. The statistical list is received by the BS 101 and transferred to the BSC 106.

Based on this information list, the BSC 106 searches for other BS's that are capable of communication with the MS 105 and checks whether or not radio resources are allotted in a step 1023. When the BSC 106 determines that communication is possible with the BS 102, the BSC 106 transmits a line start request to the BS 102 to the MS 105 in steps 1024–1025. The BSC 106 authorizes MS 105 for a link with the BS 102 by a handover start request via BS 101 in steps 1026–1027. In other words, a new link is set up between the MS 105 and the BS 102 in the same way as the conventional handover method, and the MS 105 is then capable of communication by way of the BS 101 and the BS 102 in steps 1028–1030.

When the communication between the MS.105 and the BS 101 as well as the BS 102 commences after error correction encoding and interleaving of the information to be transmitted, the MS 105 transmits at a speed that matches the respective channel quality. The BSC 106 multiplexes the signal that was received from the BS's 101 and 102 and performs deinterleaving as well as decoding. Thus the BSC 106 reproduces the signal sequence in steps 1031–1032. The operation is the same as above when the number of the BS's is three or more except that there are two or more hand off messages. In the above case, when the first connected BS is terminated, the data rate between the second BS and the MS is dependent on the receive power and the channel quality.

Figure 11:
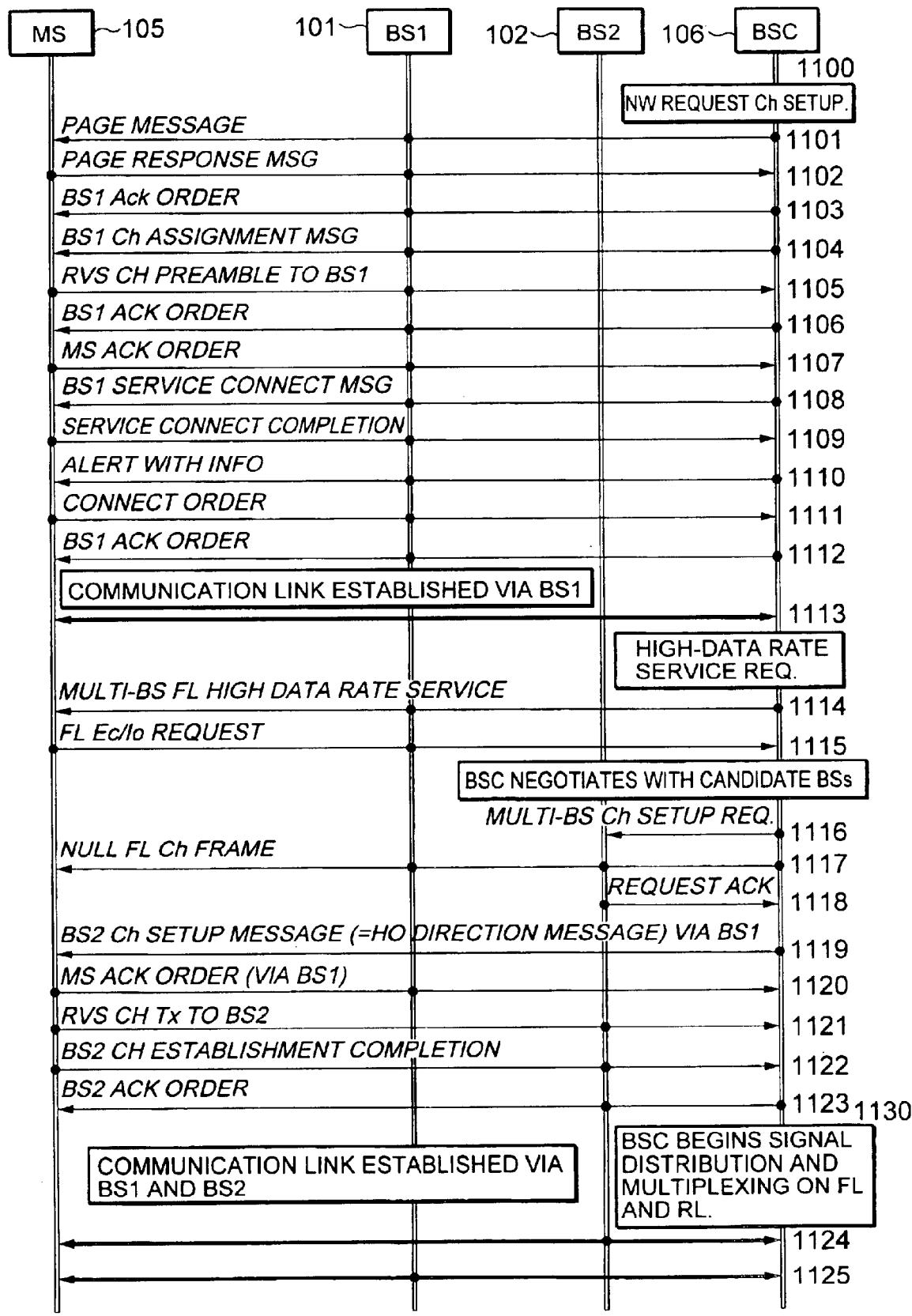
FIG. 11 is a diagram illustrating steps involved in the link setup sequence during a MS termination.

Referring to FIG. 11, the BS/BSC side initiates a MS call-up, terminates a link and sets up a plurality of links. When the BSC 106 receives a paging request for the MS 105 from the network in a step 1100, the MS 105 transmits a paging message from the position-registered BS in a step 1101. If the paging messages from the plurality of the BS's are capable of being received, synthesized and demodulated, a specified method may also be utilized. The communication procedure between the MS 105 and the BS 101 that is position-registered by the MS 105 is the same as the conventional method in steps 1102–1112.

Next, the communication service starts in a step 1113. When the high speed data service is requested by utilizing multi-BS's from the BSC side in a step 1130. the BSC 106 transmits the request message by way of the BS 101 in a step 1114. The BSC 106 at this time is already monitoring the MS 105 signals in the plurality of the BS's, and the request message is sent to those BS's that are candidates for connection. In response to the above message, the MS 105 transmits a pilot signal whose signal power is greater than a fixed threshold and the list of candidates to the BSC via BS1 in a step 1115. The BSC 106 decides on the BS candidate, based on the list information of the MS 105 and allots radio resources. The BS 102 is here allotted with radio channels in steps 1116–1118. The BS 101 sends a start message to the MS 105 for handover to the BS 102 in a step 1119. The MS 105 starts to establish a link with the BS 102 while it is still retaining a link with the BS 101 in a step 1120. The MS 105 sets up a link with the BS 102 using the same method as that used for a conventional handover in steps 1121–1123. When the MS 105 has set up a simultaneous link with the BS 102 and the BS 103, error correction and interleaving of the information are performed, and the BSC 106 distributes the information to the BS 101 and the 13S 102 at a data rate corresponding to the channel quality. The BS's 101 and 102 set each encoding and a cell or sector signal and transmit the distributed signal to the MS 105. The signals from the BS's 101 and 102 are separately demodulated in the MS 105. The demodulated multiple signals are multiplexed, interleaved and error correction encoded. The information sequence is thus reproduced in steps 1124–1125. The operation is the same as above when the number of BS is three or more except for that there are two or more hand off messages.

Figure 12:
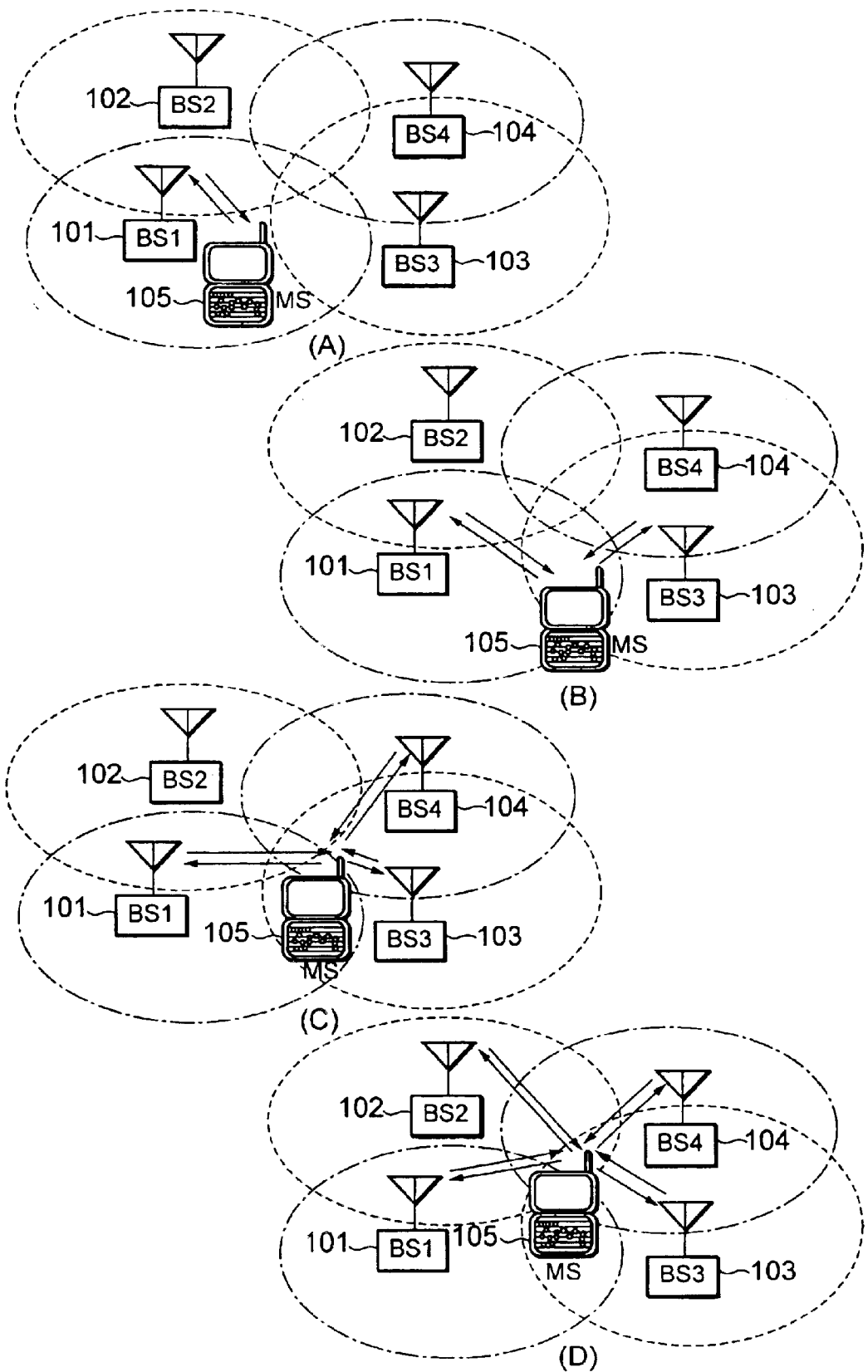
FIG. 12 is drawings showing a typical communication between a base station and a mobile station during movement of the mobile station.

Referring to FIG. 12, the principle of the handover method will be described. The service areas of BS 101 through BS 104 partially overlap with each other. For example, the MS 105 in the BS 101 area moves to the BS 104 area. In FIG. 12(a), the MS 105 is in an area where service is only possible from the BS 101 and is not connected to the other BS's 102–104. In FIG. 12(b), the MS 105 is moving to the overlapping boundary of the BS 101 and BS 103 areas. The MS 105 sets up a link with both of the BS's 101 and 103 and transmits and receives information at different data rates corresponding to the $E_b/N_o$ of each link.

In FIG. 12(c), the MS 105 is in the overlapping cell area of BS's 101, 103 and 104 and establishes links with these three BS's. The MS 105 is, however, outside the cell range of the BS 102. In this example, it is assumed that the MS 105 is communicating at a high data rate with the BS 103 as the BS 103 allows the MS 105 to obtain a more satisfactory $E_b/N_o$ value. It is also assumed that the link with the BS 101 however has poor channel quality so the data rate is reduced. The example in FIG. 12(d) shows that the MS 105 has moved to an area where connection with all four of the BS's 101 through 104 is possible. In FIG. 12(d), the four links transmit different information sequences at data rates according to the corresponding interference (SINR) conditions.

Referring to FIG. 13, the handover operation is described in detail. The case in this figure assumes that the MS 105 is connected with both the BS 101 and the BS 102 in a step 1300. The MS 105 controls the data rate according to the interference (SINR) status while it is controlling the power and the two BS's 101 and 102. Also, at least one of the plurality of links is given priority rights to transmit and receive, and the priority rights are determined according to an established order of priority. For instance, this order of priority is used in making link time slot reservations and in defining the criticality of a signal for transmission. Here, a high order of priority is first given to the BS 101 assuming that communication will continue in steps 1301–1302. In the handover, the termination of the currently connected link is performed with the same procedure as the termination in the hard handover for exchanging links between systems having different frequencies. However, the transmit/receive-of the control signal is only performed using links having a high priority.

In spite of the fact that the signal from the BS 101 has a high priority, when a weak signal intensity from the BS 101 or a signal falling below the threshold value is detected in a step 1303, other BS's with high priority link conditions are searched for in a step 1304, and the order of priority of the searched BS 102 is upgraded to a higher priority.

The MS 105 informs the BSC 106 of changes in the BS order of priority in a step 1305, and the MS 105 also reports the new BS candidate list in a step 1306. The operation for making a new BS connection is substantially the same as the one as shown in FIG. 10. When the $E_c/I_o$ A value of the BS 101 deteriorates below the threshold, the MS 105 instructs the BS 101 to lower the data rate, and the data rate from the MS 105 also lowers in a step 1309. When the $E_c/I_o$ value of the BS 101 deteriorates below the threshold and the link is difficult to maintain in a step 1308, the MS 105 reports a new BS list to the BSC 106 in a step 1309. The MS 105 further reports the termination of the BS 101 link in a step 1310 and terminates communication with the BS 101 in a step 1312. The BSC 106 cancels the BS 101 radio resources in a step 1313. Only the link with the BS 2 is maintained in this example in a step 1314.

In the above embodiment of the invention, the radio resources are utilized to the maximum in the BS distribution. In other words, even though a MS of the conventional art has a satisfactory radio frequency carrier status with a plurality of the BS's and the signals are within a specified interference noise (SINR) threshold, the conventional MS is not capable of utilizing links with other BS's while it is already connected to one link. In contrast, a preferred embodiment of the MS communicates at a data rate that matches the channel quality of other BS's. the data rate between the MS and the BSC is therefore improved.

Also in the above embodiment, during the termination of a link for the moving MS, the same traffic as the one during a soft handover is not simultaneously connected to a plurality of the BS's is However, since the FEC and the interleaved signal are distributed among the links, even though a portion of the information. might be lost, the signal damage can be compensated by utilizing encoding gain so that communication is achieved with reduced data loss during the link switching between the MS and BS.

Further in the above embodiments, even if the link between a MS and a BS temporarily deteriorates, error correction and interleaving are performed between the links that distribute the information. Even if one channel quality deteriorates, encoding gain is utilized after multiplexing with other links to improve the characteristics after demodulation.

What is claimed is:

1. A base station controller to control a plurality of base stations communicating with a mobile station, said base station controller comprising:
    a radio resource controller for maintaining a plurality of links between the mobile station and each of the base stations that the mobile station is currently reachable, said radio resource controller also maintaining separate information indicative of communication quality of each of the links;
    a link data rate controller connected to said radio resource controller for determining a data rate for each of the links based upon the communication quality; and
    a data distributor connected said radio resource controller for distributing communication data among the links to be transmitted at the corresponding data rate.

2. The base station controller according to claim 1 wherein said radio resource controller maintains the information on the communication quality based upon a report signal from the mobile station, the report signal being generated based upon a pilot signal from the base station.

3. The base station controller according to claim 2 wherein said radio resource controller updates the communication quality.

4. The base station controller according to claim 2 wherein said radio resource controller selectively maintains the links base upon a comparison of the communication quality to a predetermined threshold value.

5. The base station controller according to claim 2 wherein said radio resource controller maintains the information on the communication quality for a forward link and a reverse link.

6. The base station controller according to claim 5 wherein said link data rate controller determines a forward link data rate and a reverse link data rate respectively based upon the communication quality for the forward link and the reverse link.

7. The base station controller according to claim 6 further comprising a transmitter connected to said link data rate controller for transmitting the reverse link data rate to the base station.

8. The base station controller according to claim 1 further comprising a table memory for storing the information indicative of the communication quality of each of the links and identification information for the links.

9. A mobile station to be communicated with a plurality of base stations, said mobile station comprising:
    a radio resource controller for maintaining a plurality of links between the mobile station and each of the base stations that the mobile station is currently reachable, said radio resource controller also maintaining separate information indicative of communication quality of each of the links;
    a link data rate controller connected to said radio resource controller for determining a data rate for each of the links based upon the communication quality; and
    a data distributor connected said radio resource controller for distributing communication data among the links to be transmitted at the corresponding data rate.

10. The mobile station according to claim 9 wherein said radio resource controller maintains the information on the communication quality for a forward link and a reverse link.

11. The mobile station according to claim 10 wherein said link data rate controller determines a forward link data rate and a reverse link data rate respectively based upon the communication quality for the forward link and the reverse link.

12. A mobile station to be communicated with a plurality of base stations, said mobile station comprising:
    a plurality of receivers for simultaneously receiving sub frame information from the base stations, the sub frame information indicative of dividing frames of transmission data and data rates;
    a sub frame generator connected to said receivers for dividing the transmission data into a plurality of sub frames based upon the sub frame information; and a plurality of transmitters connected to said sub frame generator for simultaneously transmitting the sub frames of the transmission data at the data rates.

13. A method of controlling a plurality of base stations that is communicating with a mobile station, comprising the steps of:
   maintaining a plurality of links between the mobile station and each of the base stations that the mobile station is currently reachable;
   maintaining separate information indicative of communication quality of each of the links;
   determining a data rate for each of the links based upon the communication quality; and
   distributing communication data among the links to be transmitted at the corresponding data rate.

14. The method of controlling a plurality of base stations according to claim 13 wherein said communication quality is generated based upon a pilot signal from the base station.

15. The method of controlling a plurality of base stations according to claim 14 wherein said communication quality is periodically updated.

16. The method of controlling a plurality of base stations according to claim 14 wherein said links are selectively maintained base upon a comparison of the communication quality to a predetermined threshold value.

17. The method of controlling a plurality of base stations according to claim 14 wherein said communication quality is maintained for a forward link and a reverse link.

18. The method of controlling a plurality of base stations according to claim 17 wherein said data rate includes a forward link data rate and a reverse link data rate respectively based upon the communication quality for said forward link and said reverse link.

19. The method of controlling a plurality of base stations according to claim 18 further comprising an additional step of transmitting the reverse link data rate to the base station.

20. The method of controlling a plurality of base stations according to claim 13 wherein the information indicative of the communication quality of each of the links and identification information for the links are stored in a predetermined table.

21. A method of communicating with a plurality of base stations, comprising:
   maintaining a plurality of links between the mobile station and each of the base stations that the mobile station is currently reachable;
   maintaining in the mobile station separate information indicative of communication quality of each of the links;
   determining at the mobile station a data rate for each of the links based upon the communication quality; and
   distributing communication data among the links to be transmitted at the corresponding data rate.

22. The method of communicating with a plurality of base stations according to claim 21 wherein said communication quality includes information on a forward link and a reverse link.

23. The method of communicating with a plurality of base stations according to claim 22 wherein said data rate includes a forward link data rate and a reverse link data rate respectively based upon the communication quality for the forward link and the reverse link.

24. A method of communicating with a plurality of base stations, comprising:
   simultaneously receiving a plurality of sets of sub frame information at a mobile station from the base stations, the sub frame information indicative of dividing frames of transmission data and data rates;
   dividing the transmission data at the mobile station into a plurality of sub frames based upon the sub frame information; and
   simultaneously transmitting from the mobile station a plurality of sets of the sub frames of the transmission data at the data rates.

* * * * *